(12) United States Patent
Ordentlich et al.

(10) Patent No.: US 6,510,247 B1
(45) Date of Patent: Jan. 21, 2003

(54) DECODING OF EMBEDDED BIT STREAMS PRODUCED BY CONTEXT-BASED ORDERING AND CODING OF TRANSFORM COEFFIECIENT BIT-PLANES

(75) Inventors: Erik Ordentlich, Palo Alto, CA (US); Marcelo Weinberger, San Jose, CA (US); Gadiel Seroussi, Cupertino, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/213,743

(22) Filed: Dec. 17, 1998

Related U.S. Application Data

(63) Continuation-in-part of application No. 09/160,648, filed on Sep. 25, 1998.
(51) Int. Cl.[7] .................................................. G06K 9/36
(52) U.S. Cl. ........................ 382/232; 382/236; 382/240; 382/248
(58) Field of Search .................................. 382/232, 236, 382/240, 253, 248; 348/193, 419.1

(56) References Cited

U.S. PATENT DOCUMENTS

| 3,633,108 A | * | 1/1972 | Kneuer et al. ............... 325/323 |
| 4,964,166 A | * | 10/1990 | Wilson ......................... 381/34 |
| 5,625,632 A | * | 4/1997 | Ishida et al. ................... 371/43 |
| 5,867,602 A | * | 2/1999 | Zandi et al. ................. 382/248 |

OTHER PUBLICATIONS

Li et al., "Rate–Distortion Optimized Embedding", Picture Coding Symposium, Berlin, Germany, Sep. 10–12, 1997, pp. 201–206.*
Li et al., "Sharp Rate–Distortion Optimized Embedded Wavelet Coding—An Algorithm Proposal for JPEG 2000", ISO/IEC JTC1/WG1, pp. 1–15, Oct. 1997.*

* cited by examiner

Primary Examiner—Anh Hong Do

(57) ABSTRACT

A method of decoding an embedded bitstream includes the steps of reading encoded subsequences in the bitstream as ordered, decoding at least some of the ordered subsequences, and combining the subsequences to obtain reconstructed data. The encoded subsequences are read in order of decreasing expected distortion reduction per expected bit of description.

44 Claims, 9 Drawing Sheets

FIGURE 3

|   | A | B | C | D | E | F | G | H |
|---|---|---|---|---|---|---|---|---|
| 1 | SB0 | SB3 |  | SB6 |  |  |  |  |
| 2 | 100,- | SB2 |  |  |  |  | SB9 |  |
| 3 | 100,+ | 0 |  | SB5 |  |  |  |  |
| 4 | 001,- | 0 |  |  |  |  |  |  |
| 5 | 0 | 0 | 0 | 0 |  |  |  |  |
| 6 | 0 | 0 | 100,+ | 010,+ |  |  | SB8 |  |
| 7 | 0 | 0 | 001,- | 0 |  |  |  |  |
| 8 | 010,- | 0 | 0 | 0 |  |  |  |  |

DECODING OF EMBEDDED BIT STREAMS PRODUCED BY CONTEXT-BASED ORDERING AND CODING OF TRANSFORM COEFFIECIENT BIT-PLANES

CROSS-REFERENCES TO RELATED APPLICATIONS

This application is a continuation-in-part of Ser. No. 09/160,648 filed on Sep. 25, 1998.

BACKGROUND OF THE INVENTION

The invention relates to data compression. More specifically, the invention relates to the generation of embedded bitstreams.

Data compression is often used for reducing the cost of storing large data files on computers as well as reducing the time for transmitting large data files between computers. In the so-called "transform methods" data is transformed into coefficients that represent the data in a frequency domain. Coefficients may be quantized (lossy compression) without significantly affecting the quality of data that is reconstructed. Redundancy in the coefficients may then be reduced or eliminated (lossless compression) without affecting quality of the reconstructed data.

One well known class of transforms are Wavelet transforms. The Wavelet transforms may be used to perform subband decomposition and produce coefficients that describe the data in a hierarchical multiscale representation. Wavelet transforms have proven useful for the compression of images and the analysis of signals. They have been proposed as the transform for the emerging JPEG-2000 standard.

Among the advantages of the Wavelet transforms, the transform coefficients can be ordered in a hierarchical structure and transmitted in an "embedded bitstream." The embedded bitstream has a property whereby prefixes of the bitstream yield a continuum of lower rate descriptions of the data at the highest possible levels of quality. If the embedded bitstream is truncated during transmission of image data, for instance, the information already transmitted will allow an entire image to be reconstructed. The quality of the reconstructed image is dependent upon the amount information transmitted. If an embedded bitstream is truncated, a complete image of reduced quality can be reconstructed from the transmitted bits. In contrast, truncation of a non-embedded transmission might only allow several rows of an image to be reconstructed.

As additional information is transmitted, the quality of the reconstructed image is improved. If the entire bitstream is transmitted without truncation, a lossless or near-lossless image can be reconstructed.

The transmission just described is often referred to as a progressive-by-quality image transmission. The coefficients are described by bit-planes, and the most significant coefficient bits (that is, the coefficient bits conveying the most important information) are transmitted first.

Another type of transmission is often referred to as a progressive-by-resolution transmission. The progressive-by-resolution transmission involves ordering the coefficients according to different levels of image resolution. The different levels are identified by markers in the embedded bitstream. A computer may use the markers to parse the bitstream and transmit the data for the coefficients corresponding to a resolution that is specified by the receiving computer. The receiving computer can reconstruct an image according to the specified resolution.

A number of coding algorithms have been proposed for ordering the description of transform coefficients such that the retained number of bits of the description can produce the best quality image. Algorithms have been proposed by Shapiro (the "Zerotree" algorithm) and Said-Pearlman (the "SPIHT" algorithm) among others.

There are a number of problems associated with Zerotree and SPIHT algorithms. Both the Zerotree and SPIHT algorithms are based on the construction of a data structure known as a Zerotree. The Zerotree data structure is complex and memory-intensive. The encoding of quantized coefficient bit-planes relies on the use of a complex arrangement of lists and pointers.

Moreover, the Zerotree and SPIHT algorithms minimize image distortion only at bit-plane boundaries. As long as the transmission is truncated at a bit-plane boundary, the image distortion will be minimized. However, if a transmission is truncated at a point other than a bit-plane boundary, the image distortion will not be minimized.

Very often, however, the bit rate of the transmission is not controllable such that the transmission is truncated at a bit-plane boundary. For example, bit rate control might depend upon buffer size in a client. The transmission will be truncated when the buffer is full. Thus, the bit rate will depend upon the size of the buffer in the client.

Truncation of a progressive quality transmission might also occur if a network goes down. Again, the truncation might not occur at a bit-plane boundary. Thus, the image distortion might not be minimized given the amount of information that was transmitted.

Additionally, the Zerotree coders do not provide a clean separation between modeling, ordering, coding and algorithmic components. Consequently, it is difficult to tailor the Zerotree coders to satisfy certain constraints on memory and complexity. Additionally, it is difficult for Zerotree coders to provide a single bitstream that can be parsed efficiently to address both progressive-by-quality and progressive-by-resolution transmissions. Zerotree coders do not directly yield resolution-scalable bitstreams that allow for efficient progressive-by-resolution transmissions. Modifying the coding for the progressive-by-resolution transmission results in a sacrifice in performance of the progressive-by-quality transmission.

There is a need for ordering the description of the transform coefficients in a relatively simple and fast manner and for reducing image distortion over a wider range of bit rates. Overall, there is a need for a coder that is less complex than a Zerotree coder. There is also a need for a coder that has a clean separation between modeling, ordering, coding and algorithmic components. Finally, there is a need for a decoder capable of decoding bitstreams that have been encoded by such a coder.

SUMMARY OF THE INVENTION

The present invention may be regarded as a decoder that can reconstruct data from an encoded bitstream. The decoder reads encoded subsequences in the bitstream as ordered; decodes at least some of the ordered subsequences; and combines bits of the subsequences to obtain the reconstructed data. The subsequences are read in order of decreasing expected distortion reduction per expected bit of description.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 is an illustration of exemplary quantized coefficients for the subband decomposition shown in FIG. 1;

DETAILED DESCRIPTION OF THE INVENTION

Figure 1:
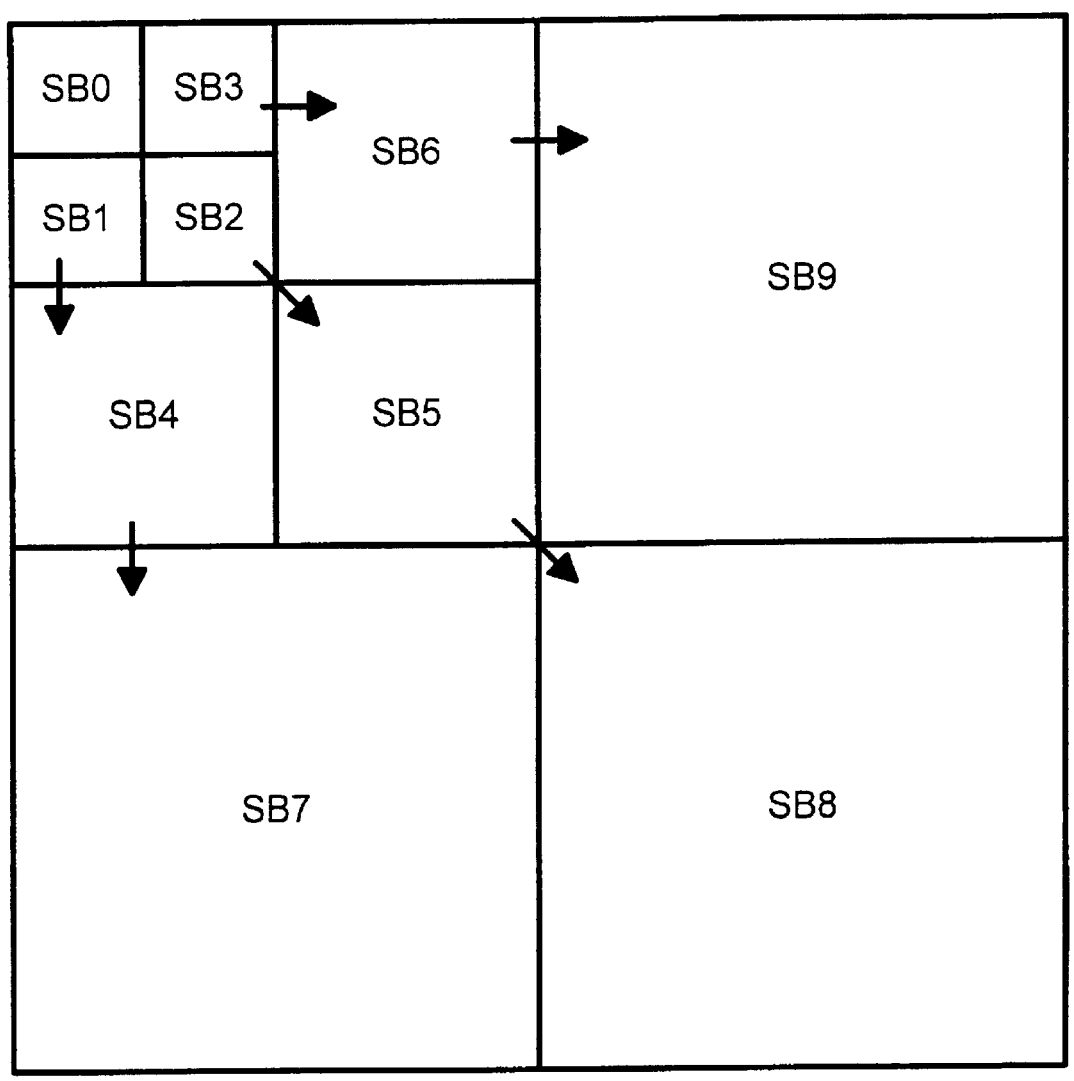
FIG. 1 is an illustration of a subband decomposition of an image.

As shown in the drawings for purposes of illustration, the present invention is embodied in a method of generating an embedded bitstream. An embedded bitstream including transform coefficient bits that are described in order of decreasing expected distortion reduction per expected bit of description is generated. The ordering is relatively simple and fast to perform. The method also lends itself to the use of low complexity coding such as adaptive elementary Golomb coding. The method also offers a clean separation between modeling, ordering, coding and algorithmic components.

The present invention is also embodied in a method of decoding the embedded bitstream. The decoding is also relatively simple and fast to perform. The decoding may be performed in multiple passes or a single pass The invention will be described as follows. First, transformation of image data into transform coefficients will be described. Next, a description of quantizing the coefficient bits into bit-planes will be provided. Then various methods of ordering and coding the quantized coefficient bits and generating embedded bitstreams will be described. Following the description of the method will be descriptions of an encoder and decoder according to the present invention. Finally, methods of decoding the embedded bitstream will be described.

FIG. 1 illustrates a hierarchical subband decomposition 8 of an eight pixel-by-eight pixel image. A Wavelet transform may be used to perform the subband decomposition. At a first level of decomposition, image data (e.g., luminance or chrominance data of an image) is filtered by high pass and low pass filters, both horizontally and vertically, and then each of the resulting bands is subsampled by a factor of two horizontally and vertically. Resulting at the first level are the following subbands: a high-pass horizontal, high-pass vertical subband; a high-pass horizontal, low-pass vertical subband; a low-pass horizontal, high-pass vertical subband; and a low-pass horizontal, low-pass vertical subband. Each subband is one-quarter the size of the original image.

Each additional decomposition is performed on the coarsest subband. Thus, a second decomposition would be performed on the low-pass horizontal, low-pass vertical subband. Three levels of decomposition are performed to produce the three-level subband decomposition 8 shown in FIG. 1. Reference will hereinafter be made to the subband decomposition 8 merely to simplify the description of the methods according to the present invention. In actual practice, the number of levels of decomposition will depend upon image size.

The coarsest frequency information may be found in the lowest frequency subband, which is located in the upper left corner (subband SB0) of the subband decomposition 8. The finest frequency information may be found in the highest frequency subband, which is located in lower right corner (subband SB9) of the subband decomposition 8.

Parent-child dependencies are shown with the arrows pointing from the subband of the parent nodes to the subbands of the child nodes. Each subband SB0 to SB9 of the subband decomposition 8 includes an array of transform coefficients $c_i$, where i is the coefficient index according to a scan of coefficients in the subband decomposition 8. There is also the usual parent-child relationship among Wavelet transform coefficients.

The coefficients are then quantized and described by bit-planes. A bit-plane may be generated by quantizing the coefficients as follows:

$$q_i = \left\lfloor \frac{|c_i|}{\Delta} \right\rfloor \mathrm{sgn}(c_i)$$

where $q_i$ is the quantization value, sgn is the sign of the coefficient $c_i$, and $\Delta$ is the quantization step. The quantizer according to the equation above is a "deadzone" quantizer.

A quantized coefficient $q_i$ may be represented across m+1 bit-planes as follows:

$$b_{m,i}\ b_{m-1,i}\ b_{m-2,i}\ \ldots\ b_{2,i}\ b_{1,i}\ b_{0,i},\ \mathrm{sgn}_i$$

where $[b_{m,i}, \ldots, b_{0,1}]$ is the binary representation of $|q_i|$ and $\mathrm{sgn}_i$ is the sign of the quantized coefficient $q_i$. The integer m is the smallest integer that satisfies $2^{m+1} > |q_i|$ for all i. Thus, if the greatest value of $q_i$ is 255, then m=7. The $n^{th}$ bit-plane consists of the bits $b_{n,i}$. Thus, the $m^{th}$ bit-plane ($b_m$) includes the most significant bit of all quantized coefficients $q_i$, and the last bit-plane 0 includes the least significant bit of all quantized coefficients $q_i$.

A coefficient $q_i$ is said to be "significant" with respect to the $n^{th}$ bit-plane if one of its bits $b_{m,i}, \ldots b_{n+1,i}, b_{n,i}$ is non-zero. A coefficient $q_i$ is said to "become significant" in the $n^{th}$ bit-plane if $b_{n,i}$ is the first non-zero bit (going from most significant bit to least significant bit). Significance information in bit-plane n refers to those $b_{n,i}$ for which bits $b_{m,i} \ldots b_{n+1,i}$ are all zero (that is, information in a bit-plane n for a quantized coefficient $q_i$ that has not yet been found to be significant). Refinement information in a bit-plane refers to those $b_{n,i}$ for which one of those bits $b_{m,i} \ldots b_{n+1,i}$ are non-zero (that is, the information in plane n for a coefficient that has already been found to be significant).

Figure 2:
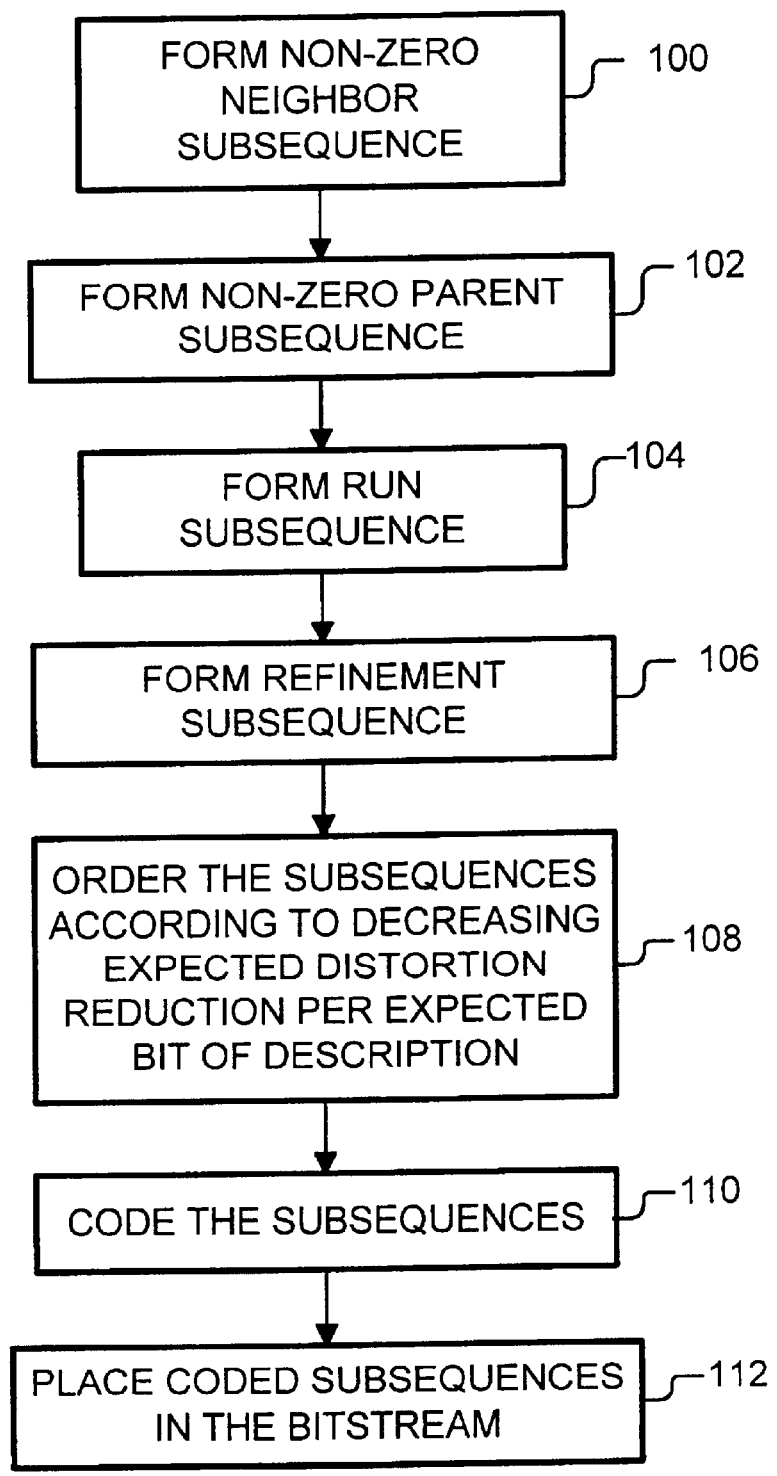
FIG. 2 is a flowchart of a method of coding quantized transform coefficients in accordance with the present invention.

Reference is now made to FIG. 2, which shows a method of coding the quantized coefficients $q_i$. A bit-plane is decomposed into a plurality of sub-bit-planes or subsequences (blocks 100, 102, 104 and 106), and the subsequences are adaptively ordered according to decreasing expected distortion reduction per expected bit of description (block 108). It will be implicitly assumed that the sign $sgn_i$ of a coefficient $q_i$ is encoded into the bitstream immediately after the first non-zero bit of the coefficient $q_i$ is encoded as the bit-planes are processed from most significant to least significant.

The application of the ordering criteria above can be simplified by relying upon some reasonable assumptions about the distribution of Wavelet transform coefficients. These assumptions imply that in each bit-plane significance information should precede refinement information. These assumptions also imply that in each bit-plane, for significance information consisting of bits $b_{n,i}$ the expected distortion reduction per expected bit of description is non-decreasing in the probability that $b_{n,i}=1$ (the probability that the $i^{th}$ coefficient becomes significant in the $n^{th}$ bit-plane). Thus, the ordering of subsequences of significance information may be done according to an estimate of the relative magnitudes of the probabilities that $b_{n,i}=1$ in each of the subsequences. Note that for the ordering of significance information, the actual values of the probabilities need not be ascertained. Instead, a ranking according to decreasing magnitude may suffice.

The ranking of the probabilities that $b_{n,i}=1$ (according to decreasing magnitude) in the subsequences could be adaptively learned or estimated for each image. In the alternative, the ranking could be based on a priori assumptions. The decision on how to order the refinement information relative to the subsequences of significance information may depend on comparing the estimates of the probability of 1 in each subsequence to a threshold. Refinement information should precede all subsequences with significance probabilities that are smaller than the threshold. In practice, it is assumed that these probabilities are always larger than the threshold. Consequently, refinement information is ordered after significance information.

The following additional assumptions may be made about the relative magnitudes of the probabilities that $b_{n,i}=1$ in each of the subsequences of significance information. It is reasonable to assume that a coefficient having significant neighbors will have a higher probability of becoming significant than a coefficient having all insignificant neighbors. It is also reasonable to assume that a coefficient having a significant parent will have a higher probability of becoming significant than a coefficient having an insignificant parent. The above assumptions imply that a bit of a coefficient having significant neighbors with respect to previous bit-planes will have a greater expected distortion reduction per expected bit of description than a bit of a coefficient having all insignificant neighbors with respect to the previous bit-planes; and a bit of a coefficient having a significant parent with respect to the previous bit-planes will have a greater expected distortion reduction per expected bit of description than a bit of a coefficient having an insignificant parent with respect to the previous bit-plane.

By way of example, the following four subsequences could be formed and ordered according to the above assumptions about expected distortion reduction per expected bit of description: a Non-Zero Neighbor subsequence, a Non-Zero parent subsequence, a Run subsequence, and a Refinement subsequence.

Each coefficient bit $b_{n,i}$ in the Non-Zero Neighbor subsequence corresponds to a coefficient that is not significant with respect to the $(n+1)^{th}$ bit-plane. Thus, $b_{m,i}=0$, $b_{m-1}=0, \ldots b_{n+1,i}=0$. The bit $b_{n,i}$ is part of the significance information for the $n^{th}$ bit-plane. However, at least one coefficient in the neighborhood of coefficient bit $b_{n,i}$ was found to be significant with respect to the $(n+1)^{th}$ bit-plane. Thus, $[b_{m,j}, b_{m-1,j}, \ldots, b_{n+1,j}] \neq$ for some j in the neighborhood (where the vector notation $[\ldots] \neq 0$ means that one of the bits within the brackets is not equal to zero). A neighborhood might include eight spatially adjacent neighboring coefficients. Thus, each coefficient bit $b_{n,i}$ in the Non-Zero Neighbor subsequence was still insignificant with respect to the previous bit-plane, but it had at least one significant neighbor with respect to the previous bit-plane.

Each coefficient bit $b_{n,i}$ in the Non-zero Parent subsequence corresponds to a coefficient that is not significant with respect to the $(n+1)^{th}$ bit-plane. Additionally, no coefficient in the neighborhood of coefficient bit $b_{n,i}$ was found to be significant with respect to the $(n+1)^{th}$ bit-plane. However, the parent of the coefficient $q_i$ was found to be significant with respect to the $(n+1)^{th}$ bit-plane. Thus, $[b_{m,f(i)}, \ldots, b_{n+1,f(i)}] \neq 0$ where the index f(i) corresponds to the parent of coefficient $q_i$. Thus, each coefficient bit $b_{n,i}$ in the Non-zero Parent subsequence was still insignificant in the previous bit-plane, and its neighbors in the previous bit-plane are insignificant. However, the parent in the previous bit-plane is significant.

Each coefficient bit $b_{n,i}$ in the Run subsequence corresponds to a coefficient that is not significant with respect to the $(n+1)^{th}$ bit-plane. Additionally, no coefficient in the neighborhood of coefficient bit $b_{n,i}$ was found to be significant with respect to the $(n+1)^{th}$ bit-plane, and also the parent was found insignificant with respect to the $(n+1)^{th}$ bit-plane.

Each coefficient bit $b_{n,i}$ in the Refinement sequence corresponds to a coefficient that has already been found significant with respect to the $(n+1)^{th}$ bit-plane.

If the additional prior assumptions on the ranking of the probabilities of a 1 are used, the Non-Zero Neighbor subsequence is assumed to have a greater expected distortion reduction per expected bit of description than the Non-Zero Parent subsequence, the Non-Zero Parent subsequence is assumed to have a greater expected distortion reduction per expected bit of description than the Run subsequence, and the Run subsequence is assumed to have a greater expected distortion reduction per expected bit of description than the Refinement subsequence. Thus, the Non-Zero Neighbor subsequence is ordered in the bitstream in front of the Non-Zero Parent subsequence, the Non-Zero Parent subsequence is ordered in front of the bitstream before the Run subsequence, and the Refinement subsequence is ordered in the bitstream after the Run subsequence.

Some (or all) of the ordered sub-bit-planes are encoded (block 110), and the encoded sub-bit-planes are placed in the bitstream as ordered (block 112).

The subsequences may be entropy encoded to extract statistical redundancy in the bitstream by estimating the probability of sequences of symbols occurring. Shorter code lengths are assigned to the more probable sequences of symbols such that the average encoding length is minimized. Thus, the most probable outcome is encoded with the least number of bits. The entropy encoding may be performed by an entropy encoder such as a conventional arithmetic encoder or by a context-based arithmetic encoder.

However, the method lends itself to the use of lower complexity coding schemes in the following manner.

The above subsequences of bits in a bit-plane n represent a de-interleaving of data based on the probability that $b_{n,i}=1$. While the data is de-interleaved to enable ordering of the description of the data in the bit-plane n according to the probability that $b_{n,i}=1$, the de-interleaving also serves as an initial context modeling step that captures most of the dependencies in the data. The de-interleaved subsequences may thus be effectively modeled as separate independently and identically distributed ("i.i.d"). Sources (with different statistics for $b_{n,i}=1$) and encoded using adaptive elementary Golomb coding, which is nearly optimal for such sources, as described in a paper entitled "A Low Complexity Modeling Approach for Embedded Coding of Wavelet Coefficients " by E. Ordentlich, M. Weinberger and G. Seroussi, Proceedings of 1998 IEEE Data Compression Conference, Mar. 29 to Apr. 1, 1998, pp. 408–417.

Another example of an adaptation for elementary Golomb coding is disclosed in U.S. Pat. No. 4,191,974.

Adaptive elementary Golomb coding can be very effective for skewed distributions such as the Run subsequence (very high probability of 0). However, it can also be effective for sequences with less skewed distributions such as the Non-Zero Neighbor and Non-Zero Parent subsequences. The Golomb encoder is less complex than an arithmetic encoder.

The sign of a coefficient is encoded in the bit-stream immediately after the first non-zero bit for that coefficient is encountered, i.e. when the coefficient first becomes significant. When using adaptive elementary Golomb coding to code the subsequences, the sign of a newly significant coefficient $q_i$ is inserted uncoded (after mapping a negative sign to 0 and a positive sign to 1) immediately after the elementary Golomb codeword indicating the first non-zero bit of this coefficient.

In the Refinement subsequence, there is close to an equal probability that the next bit will be a one or a zero. If adaptive elementary Golomb encoding is performed, it is preferred not to code the Refinement subsequence. The uncoded Refinement subsequence should be appended to the bitstream.

Figure 4:
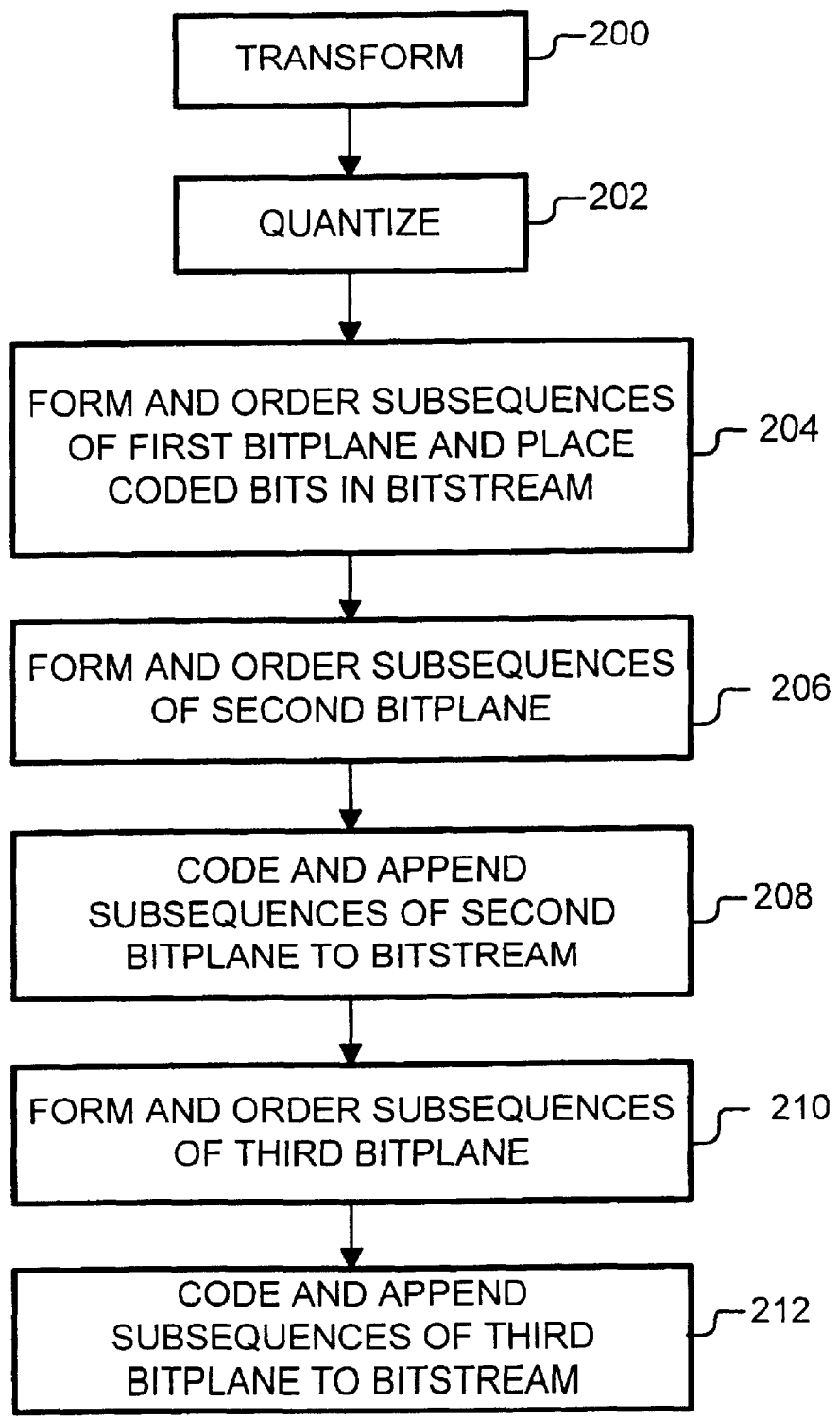
FIG. 4 is a flowchart of a method of generating a bitstream in accordance with the present invention.

A simple example of generating an embedded bitstream is described in connection with FIGS. 3 and 4. Data is transformed via a Wavelet transform (block 200) and quantized (block 202) to produce the coefficients shown FIG. 3. Only quantized coefficients for the lower left zone are shown. This will be sufficient to illustrate how the method is carried out. However, it is understood that coefficients will be processed for the other zones as well.

Again to simplify the explanation of the invention, $|q_i|<8$. Therefore, the coefficients may be described in three bit planes, and each quantized coefficient may be represented as: $b_2\ b_1\ b_0$, sgn.

Quantized coefficients will be referred to by row and column numbers instead of the notation $q_i$ described above. Therefore, coefficient A4 will refer to the quantized coefficient in the first column, fourth row. Coefficient A4 is represented as $b_2=0$, $b_1=0$, $b_0=1$ and sgn=(−). Coefficient A4 has four children: coefficients A7, A8, B7 and B8.

After the coefficients have been quantized, a first bit-plane $b_{2,i}$ is coded and placed in the bitstream (block 204). The first bit plane is scanned (e.g., using a raster scan). Each bit that is scanned may be placed in a buffer. When a non-zero bit is found, the sign (sgn) is also placed in the buffer. After the first bit-plane has been'scanned, the buffer includes the most significant bit of each quantized coefficient. The buffer is coded and placed in the bitstream.

The second bit-plane $b_{1,i}$ is coded (block 206) according to the method described in connection with FIG. 2. The coarser subbands may be coded before the finer subbands. Within each subband, the coefficient bits are scanned using a raster or some other scan. Each coefficient bit is placed in either the Non-Zero Neighbor subsequence, the Non-Zero Parent subsequence, the Run Subsequence or the Refinement subsequence.

Figure 5:
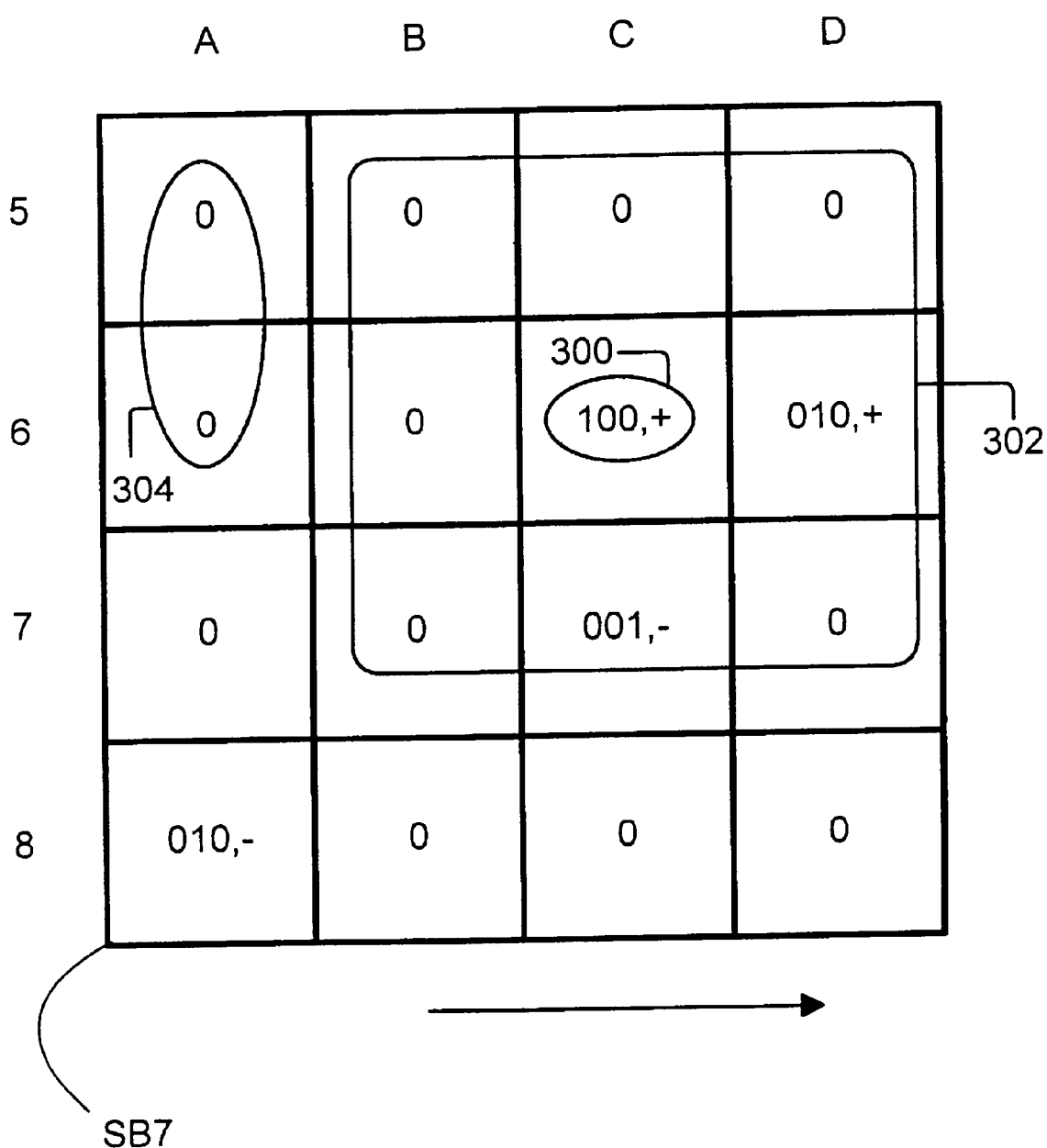
FIG. 5 is an illustration of subsequences of transform coefficients in a subband, the subsequences being formed in accordance with the method shown in FIG. 4.

Additional reference is now made to FIG. 5, which illustrates subsequences in subband SB7. Significance information and refinement information for the second bit-plane is as follows: the second bit $b_1$ of coefficient C6 provides refinement information (since coefficient C6 has already been found to be significant with respect to previous bit-planes); and the second bits $b_1$ of the other coefficients provide significance information.

The subband SB7 is raster scanned one row at a time, starting at row 5. Each row is scanned in the direction of the arrow, starting from column A. Since coefficient C6 (indicated by a first ellipse 300) has already been found to be significant with respect to previous bit-planes, its second bit $b_1$ is added to the Refinement subsequence. The second bits $b_1$ of those coefficients in the neighborhood of coefficient C6 (the neighborhood being indicated by a second ellipse 302) are added to the Non-Zero Neighbor subsequence. Coefficients A5 and A6 (indicated by a third ellipse 304) have insignificant neighbors but a significant parent (coefficient A3); therefore the second bits $b_1$ of coefficients A5 and A6 are added to the Non-Zero Parent subsequence. The remaining coefficients have insignificant neighbors and insignificant parents with respect to previous bit-planes. Therefore, the second bits $b_1$ of the remaining coefficients are added to the Run subsequence. Table 1 shows the resulting subsequences for the second bit-plane. Coefficients corresponding to the second bits $b_1$ are shown in parenthesis. The signs of the newly significant coefficients are also shown.

After the second bit-plane has been scanned, the Non-Zero Neighbor subsequence for the second bit-plane is coded and appended to the bitstream, the Non-Zero Parent subsequence for the second bit-plane is coded and appended to the bitstream, the Run subsequence for the second bit-plane is coded and appended to the bitstream, and the Refinement subsequence for the second bit-plane is appended to the bitstream (block 208). Different coding strategies may be used for the different subsequences. In the alternative, the coefficient bits may be coded and added to the bitstream immediately after they are scanned, thereby eliminating the need for an intermediate buffer.

TABLE 1

| Non-Zero Neighbors | Non-Zero Parent | Run | Refinement |
|---|---|---|---|
| 0 (B5) | 0 (A5) | 0 (A7) | 0 (C6) |
| 0 (C5) | 0 (A6) | 1 (A8), − | |
| 0 (D5) | | 0 (B8) | |
| 0 (B6) | | 0 (C8) | |
| 1 (D6), + | | 0 (D8) | |
| 0 (B7) | | | |
| 0 (C7) | | | |
| 0 (D7) | | | |

After the second bit-plane $b_{1,i}$ has been coded, the third bit-plane $b_{0,i}$ is coded (block 210) according to the method described in connection with FIG. 2. After the third bit-plane has been scanned, the Non-Zero Neighbor subsequence for the third bit-plane is coded and appended to the bitstream, the Non-Zero Parent subsequence for the third bit-plane is coded and appended to the bitstream, the Run subsequence for the third bit-plane is coded and appended to the bitstream, and the Refinement subsequence for the third bit-plane is appended to the bitstream (block 212). Or, in the alternative, the coefficients may be coded and added to the bitstream immediately after they are scanned.

After the last bit-plane has been coded, the method is finished. If the bitstream is truncated during the transmission of the third bit-plane, distortion of the reconstructed image will be minimized given the amount of coefficient bits that were transmitted.

In the example above, ordering of coefficient bits in a current bit-plane was context-based. The ordering was based on the values of coefficient bits that had already been coded. More specifically, the ordering was based on previously encoded bit-planes of neighboring and parent coefficients.

However, the method is not limited to the context described above. The ordering of the coefficient bits may be based on a different context. For example, the ordering may be based on neighbors, but not parents. If the context does not include parents, then the coefficients may be coded in a direction other than coarsest subband to finest subband. Moreover, if the context does not include parents, a transform that does not perform subband decomposition (e.g., a DCT transform) may be used.

The context is not limited to the four subsequences. For example, the Run subsequence could be further decomposed into two additional subsequences. The context could also include subbands other than the parent subband. Run subsequence bits of coefficients having significant neighbors in other subbands could comprise one of the additional subsequences.

Moreover, the ordering method is not limited to the use of previously encoded bit-planes. Coefficient bits that have already been encoded in the current bit plane may be used as context for ordering and coding the unencoded coefficient bits in the current plane. An example of this will now be described in connection with FIG. 6. A raster scan of subband SB7 is performed in the direction indicated by the arrow. Coefficient A5 is scanned first, and coefficient D8 is scanned last. The second bit $b_1$ of coefficient C6 provides refinement information, and the second bits $b_1$ of the other coefficients provide significance information. Note the change to coefficient D7.

Figure 6:
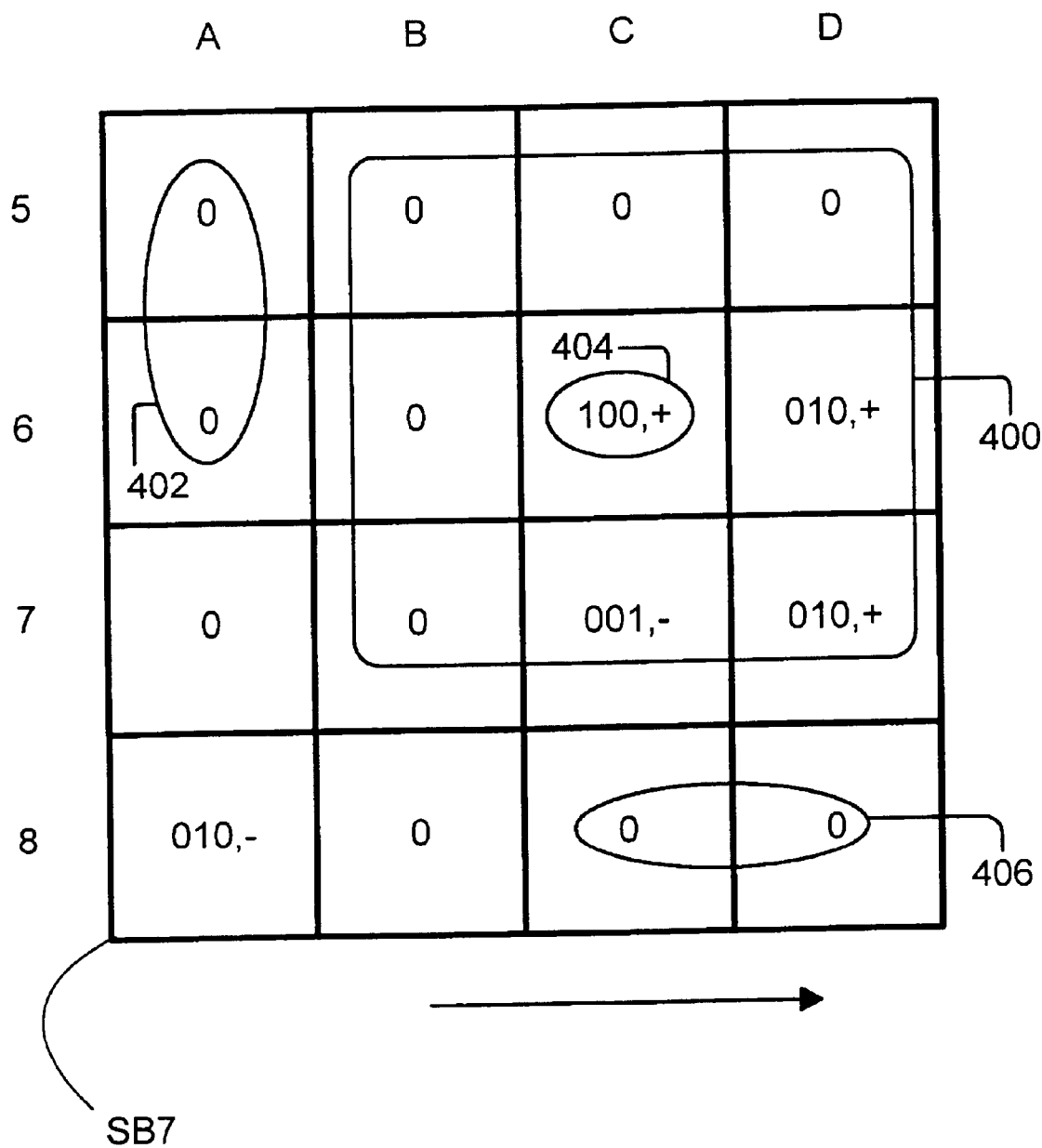
FIG. 6 is an illustration of subsequences of transform coefficients in a subband, the subsequences being formed in accordance with a different method according to the present invention.

As shown in FIG. 6, the second bits $b_1$ for those coefficients B5, C5, D5, B6, D6, B7, C7 and D7 in the neighborhood indicated by a first ellipse 400 are still added to the Non-Zero Neighbor subsequence. The second bits $b_1$ of the coefficients A5 and A6 indicated by a second ellipse 402 are still added to the Non-Zero Parent subsequence. The second bit $b_1$ of the coefficient C6 indicated by the third ellipse 404 is still added to the Refinement subsequence. The second bits $b_1$ of coefficients A7 and A8 are still added to the Run subsequence. However, the second bit $b_1$ of coefficients C8 and D8 (indicated by a fourth ellipse 406) are added to the Non-Zero Neighbor subsequence instead of the Run subsequence. This happens because the coefficient D7 becomes significant during the scan of the second bit-plane and, therefore, becomes available as context for ordering and coding coefficients C8 and D8 with respect to the second bit-plane.

The method of forming and ordering the subsequences may be implemented in a single pass or multiple passes. The multiple pass could be performed in various ways. All of the subsequences of a given bit-plane could be formed, ordered and coded in a single pass, but the various bit-planes could be coded in multiple passes. Or, the subsequences of each bit-plane could be formed, ordered and coded in multiple passes. The forming, ordering and coding of the subsequences in FIG. 4, for example, is performed in multiple passes.

Figure 7:
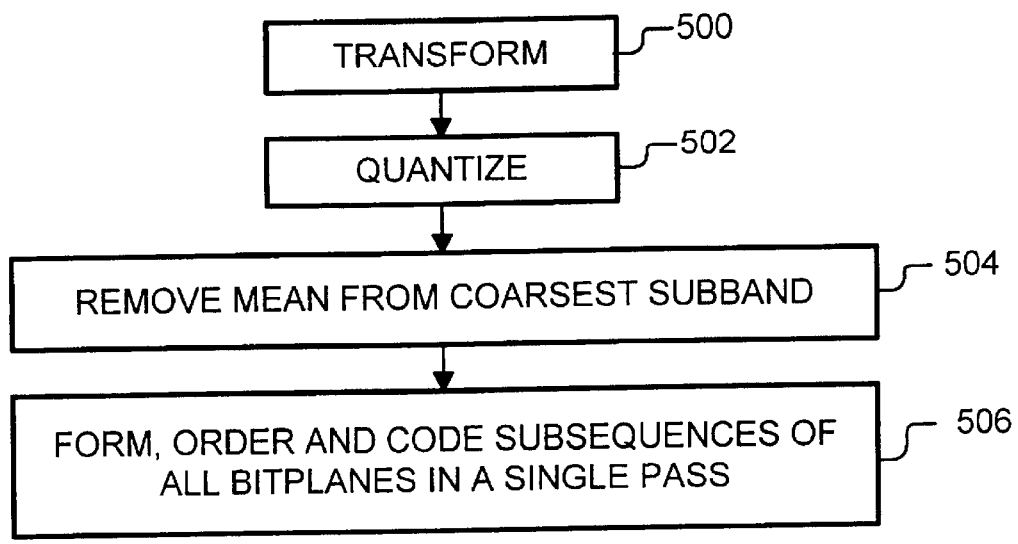
FIG. 7 is a flowchart of a method of generating a bitstream in a single pass.

If the method is performed in a single pass, all of the subsequences for all of the bit-planes will be coded in a single pass. When a coefficient is scanned during single-pass coding, all of its bits are classified into the various subsequences, and all of its subsequences are encoded, all before the next coefficient is scanned. Thus, each coefficient is completely processed before the next coefficient is scanned. FIG. 7 shows steps 500 to 506 for coding first, second and third bit-planes in a single pass.

Other variations to the method include, but are not limited to, the following. Instead of placing the subsequences in files and coding the files after a bit-plane is scanned, the bits may be coded and placed directly into one or more bitstreams. If separate bitstreams are generated for each of the subsequences, the separate bitstreams may be re-arranged offline (on byte boundaries) for optimal embedding.

Following quantization and before the subsequences for the bit-planes are formed and ordered, the coarsest subband SB0 of the decomposition 8 may be modified by determining the mean of the coefficients in the coarsest subband SB0 and subtracting the mean from the coefficients in the coarsest subband SB0 (see step 504 in FIG. 7). If the coarsest subband SB0 includes only a single coefficient (e.g., coefficient A1), the coefficient of the coarsest subband in the mean-removed decomposition would be equal to 0. The mean of the coarsest subband SB0 may be placed in the header of the bitstream.

The neighborhood is not limited to spatially adjacent neighbors. The neighborhood may be block based. Consider the coefficients C5, D5, C6 and D6 in subband;SB7 of FIG. 3. In a 2×2 block-based neighborhood, the neighbors of coefficient C5 might be D5, C6 and D6, and the neighbors of coefficient D6 would be C5, D5 and C6 (in contrast, the spatially adjacent neighbors of coefficient C5 in subband SB7 would be B5, D5, B6, C6 and D6, and the spatially adjacent neighbors of coefficient B5 would be coefficients A5, C5, A6, B6 and C6).

The embedded bitstream may be decoded by reversing the method used to generate the bitstream. Thus, reversing the method may be used to reconstruct an image or data signal from the embedded bitstream.

Figure 8:
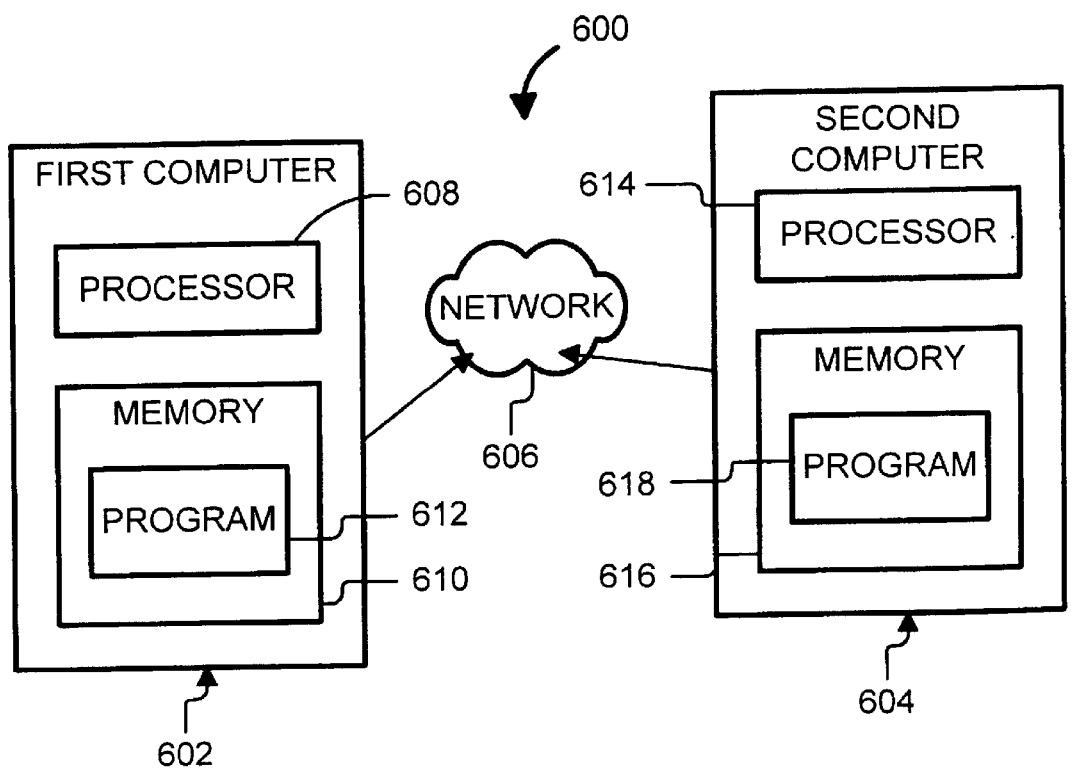
FIG. 8 is an illustration of an encoder/decoder system according to the present invention.

Reference is now made to FIG. 8, which shows an encoder-decoder system 600 according to the present invention. The system 600 includes first and second computers 602 and 604 that communicate over a network 606. The network 606 could be anything from a local area network to the Internet. The first computer 602, which will also be referred to as the encoder 602, includes a first processor 608 and first memory 610 for storing an encoder program 612 that performs data compression. The encoder program 612 might be an image editor program that edits bitmaps and compresses the bitmap images.

The encoder program 612 includes a plurality of executable instructions for instructing the first processor 608 to transform the bitmap image into transform coefficients; quantize the coefficients, generate bit-planes of the quantized coefficients; decompose the bit-planes into the subsequences; order the subsequences according to decreasing expected distortion reduction per expected bit of description; encode the ordered subsequences, place the subsequences in a bitstream as ordered; and send the bitstream to the second computer 204.

The second computer 604, which will also be referred to as the decoder 604, includes a second processor 614 and memory 616 for storing a decoder program 618 that instructs the second processor 614 to decode the bitstream and display a reconstructed image. The second program 618 could be, for example, a web browser or an image editor.

Figure 9:
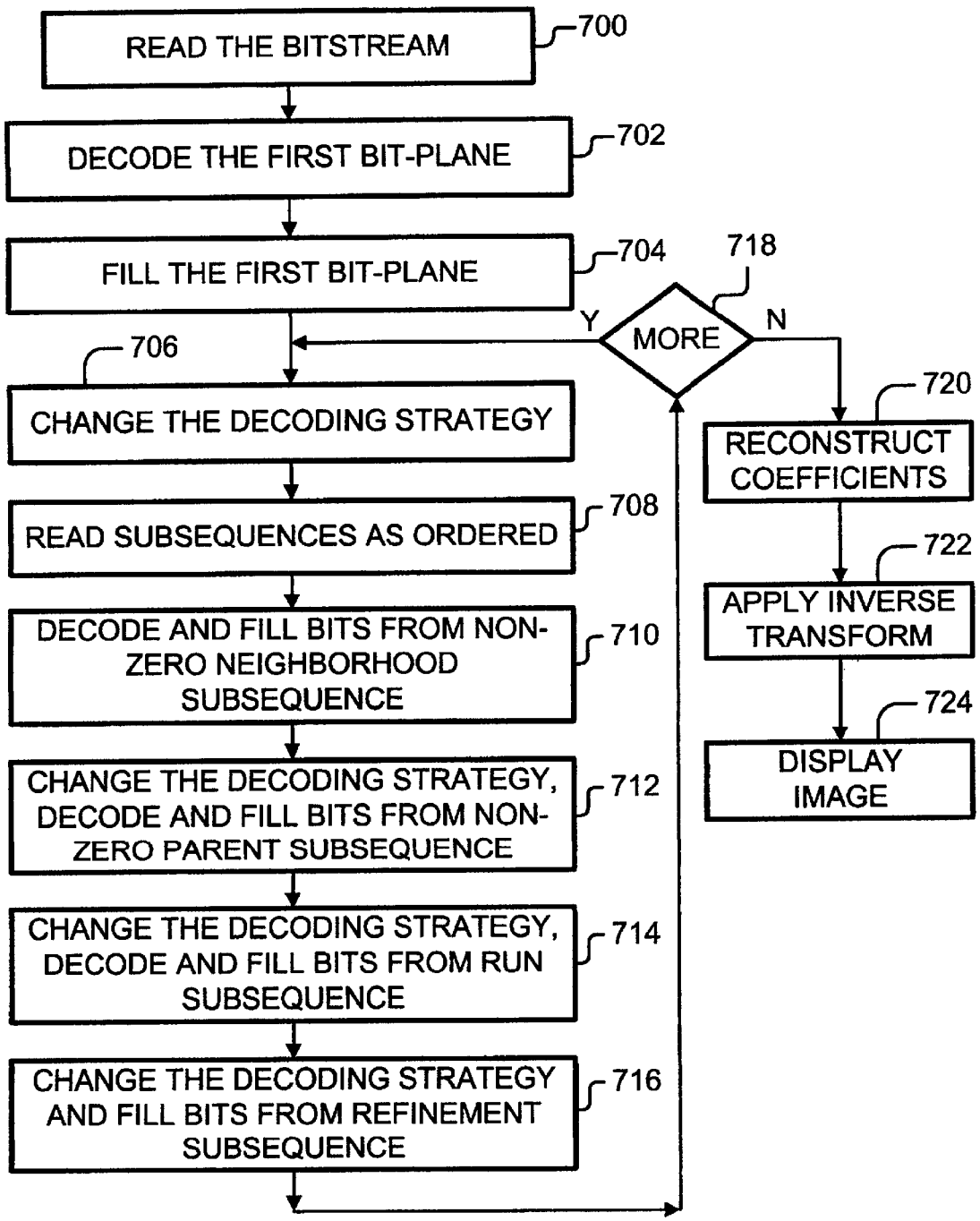
FIG. 9 is a flowchart of a method of decoding a bitstream in accordance with the present invention.

Referring now to FIG. 9, the image may be reconstructed from the encoded bitstream as follows. The decoder 604 begins reading (700) the embedded bitstream. Since the encoded bitstream is arranged from highest bit-plane to lowest bit-plane, the first bit-plane is reconstructed first.

The bits of the first bit-plane are decoded (block 702) and the first bit-plane is filled (block 704). A context is not used for filling the first bit-plane. Unfilled bit positions of the first bit-plane are scanned in the same order as during the coding. For each unfilled location that is scanned, a bit is decoded and used to fill that location. If the bit indicates a significant coefficient with respect to the current bit-plane, the sign of that bit is also decoded and added to that location. Thus, if the decomposition of FIG. 3 was ordered according to a raster scan, the first bits $b_2$ of the coefficients of subbands SB1, SB4 and SB7 would be filled in the following order: A2, A3, B3, A4, B4, A5, B5, C5, D5, A6, B6, C6, D6, A7, B7, C7, D7, A8, B8, C8 and D8.

The decoding (block 702) and bit-filling (block 704) are actually interleaved. A bit is decoded and added to an unfilled location of the first bit-plane. Another bit is decoded and added to another unfilled position of the first bit-plane. This is performed until the first bit-plane is filled. By filling the first bit-plane, the decoder 604 determines that second bit-plane is about to be decoded and that the next decoded bit should be from the Non-Zero Neighbor subsequence.

At this point, the decoding strategy might be changed (block 706). If an adaptive elementary Golomb encoder used different strategies to encode the different subsequences (which is preferred, since the different subsequences have different statistics), an adaptive elementary Golomb decoder would adjust the decoding strategy to decode the Non-Zero Neighbor subsequence.

As will be seen, decoding and bit-filling are also interleaved for the remaining bit-planes. Such interleaving allows the decoder 604 to determine when a new subsequence is about to be decoded. Consequently, the interleaving allows the decoder 604 to determine when the decoding strategy should be changed.

After the first bit-plane has been reconstructed, the decoder 604 begins to read the encoded subsequences as ordered in the bitstream (block 708). The subsequences are grouped according to bit-planes. Each subsequence spans all of the subbands in its bit-plane, in the direction of coarsest frequency to finest frequency. Additionally, the subsequences of each bit-plane are arranged in order of decreasing expected distortion reduction per expected bit of description. Thus, for the decomposition of FIG. 3, the decoder 604 will read the Non-Zero Neighbor subsequence, the Non-Zero Parent subsequence, the Run subsequence, and the Refinement Subsequence of the second bit-plane, and then it will read the Non-Zero Neighbor subsequence, the Non-Zero Parent subsequence, the Run subsequence, and the Refinement Subsequence of the third bit-plane. Within each subsequence, the decoder 604 will read bits starting in the coarsest frequency subband SB0 and finishing in the finest frequency subband SB9.

The decoder 604 begins reconstructing the second bit-plane according to the context of the bits in the previously-filled (first) bit-plane. Reconstruction is performed in four passes. Bits are filled from the Non-Zero Neighbor subsequence during the first pass, from the Non-Zero Parent subsequence during the second pass, from the Run subsequence during the third pass, and from the Refinement subsequence during the fourth pass.

During the first pass (block 710), the second bit-plane is scanned in the same order in which it was encoded. At each unfilled location the decoder 604 distinguishes between a significance decision and a refinement decision. Thus, the decoder 604 determines whether the unfilled location belongs to a coefficient that has already been found significant with respect to the previous bit-plane. If the coefficient has already been found to be significant, the decoder skips that unfilled location. Additionally, if an unfilled location does not have significant neighbor coefficients with respect to the previous bit-plane, the decoder 604 skips that location. If, however, the unfilled location does have significant neighbor coefficients with respect to the previous bit-plane, the decoder 604 decodes the next bit in the bitstream and fills the unfilled location with that decoded bit. If the decoded bit indicates a significant coefficient with respect to the current bit-plane, the sign of that bit is also decoded and added. At the end of the first pass, all of the bits in the Non-Zero Neighbor subsequence should have been decoded and added to the second bit-plane.

During the second pass (block 712), the decoder 604 changes the decoding strategy and once again scans the second bit-plane. If an unfilled location does not have significant parent coefficients with respect to the previous bit-plane, the decoder 604 skips that location. If the unfilled location does have significant parent coefficients with respect to the previous bit-plane, the decoder 604 decodes the next bit in the bitstream and fills the unfilled location with that decoded bit. If the decoded bit represents a significant coefficient with respect to the current bit-plane, the sign of that bit is also decoded and added. At the end of the second pass, all of the bits in the Non-Zero Parent subsequence should have been decoded and added to the second bit-plane.

During the third pass (block 714), the decoder 604 changes the decoding strategy and once again scans the second bit-plane. For each unfilled location, the decoder 604 examines whether the coefficients are significant. If a coefficient is significant, the decoder 604 skips that location. If not, the decoder 604 decodes the next bit in the decoded bitstream and fills the unfilled location with that decoded bit. If the decoded bit indicates a significant coefficient with respect to the current bit-plane, the sign of that bit is also decoded and added. At the end of the third stage, all of the bits in the Run subsequence should have been decoded and added.

During the fourth stage (block 716), the decoder 604 changes the decoding strategy and once again scans the second bit-plane. For each unfilled position that is encountered, the decoder 604 decodes a bit and fills the position with the decoded bit. Thus, the locations are filled from the Refinement subsequence. Since the decoded bits are refinement bits, the signs have already been decoded and added. Block 716 is based on the assumption that the Refinement subsequence was adaptively encoded. If, however, the Refinement subsequence was not encoded, but merely appended to the bitstream, then the decoder 604 simply fills each remaining unfilled location with a bit from the bitstream.

The steps represented by block 710 to 716 are performed on each subsequent bit-plane until all of the available bit-planes have been processed (block 718). If the bitstream has been truncated for some reason, the decoder 604 stops decoding after the last received bit has been processed. If the entire Refinement subsequence of the third bit-plane was truncated, for example, the decoder 604 would stop decoding after completing block 716.

Thus, at each bit-plane, the decoder 604 decodes the ordered subsequences in order of decreasing expected distortion reduction per expected bit of description. The decoder 604 also reconstructs each bit-plane from subsequences in order of decreasing expected distortion reduction per expected bit of description.

After the bit-planes have been reconstructed, the decoder 604 reconstructs transform coefficients from the reconstructed bit-planes (block 720). The transform coefficients may be reconstructed by using the midpoints of available quantization intervals.

The decoder 604 then performs an inverse transform on the reconstructed transform coefficients (block 722). Resulting is image data that can be displayed (block 724).

An example of reconstructing subbands SB1, SB4 and SB7 of the second bit-plane for the decomposition shown in FIG. 3 will now be provided. In the first pass, the decoder 604 looks for non-refinement bits having significant neighbor coefficients with respect to the first bit-plane. Therefore, the decoder skips coefficients A2, A3, fills the second bits $b_1$ of coefficients B3, A4 and B4, skips coefficient A5, fills the second bits $b_1$ of coefficients B5, C5 and D5, skips coefficient A6, fills the second bit $b_1$ of coefficient B6, skips coefficient C6, fills the second bit $b_1$ and sign of coefficient D6, skips coefficient A7, fills the second bits $b_1$ of coefficients B7, C7 and D7, and skips coefficients A8, B8, C8 and D8.

In the second pass, the decoder 604 looks for non-refinement, unfilled bits having significant parent coefficients with respect to the first bit-plane. Therefore, the decoder 604 skips coefficients A2, A3, B3, A4 and B4, fills the second bit $b_1$ of coefficient A5, skips coefficient B5, C5 and D5, fills the second bit $b_1$ of coefficient A6, and skips the remaining coefficients.

In the third pass, the decoder 604 looks for non-refinement, unfilled bits having no significant parent or neighbor coefficients with respect to the previous bit-plane. Therefore, the decoder 604 skips coefficients A2, A3, B3, A4, B4, A5, B5, C5, D5, A6, B6, C6 and D6, fills the second bit $b_1$ of coefficient A7, skips coefficient B7, C7 and D7, fills the second bit $b_1$ and sign of coefficient A8, and fills the second bits $b_1$ of coefficients B8, C8 and D8.

The fourth pass is the refinement pass. In the fourth stage, the decoder 604 fills the unfilled second bits $b_1$ of coefficients A2, A3 and then C6.

Thus far, the bitstream has been described as a mere concatenation of subsequences without any markers delineating the subsequence boundaries. The decoder 604 knows that a subsequence has ended when it finishes its scan of a bit-plane. Decoding such a bitstream, the decoder 604 performs a pass for each subsequence in a bit-plane, and the decoder 604 reconstructs one bit-plane at a time. The first bit-plane is reconstructed, then the second bit-plane is reconstructed, then the third bit-plane is reconstructed, and so on.

However, the encoder 602 may embed auxiliary information (e.g., markers) in the bitstream to indicate boundaries of the bit-planes, boundaries of the subsequences within each bit-plane, and boundaries of the subbands within each subsequence. Using such auxiliary information, the decoder 604 can perform the decoding in a single pass instead of multiple passes, it can interleave the decoding of bit-planes, and it can interleave the decoding of subbands.

Figure 10:
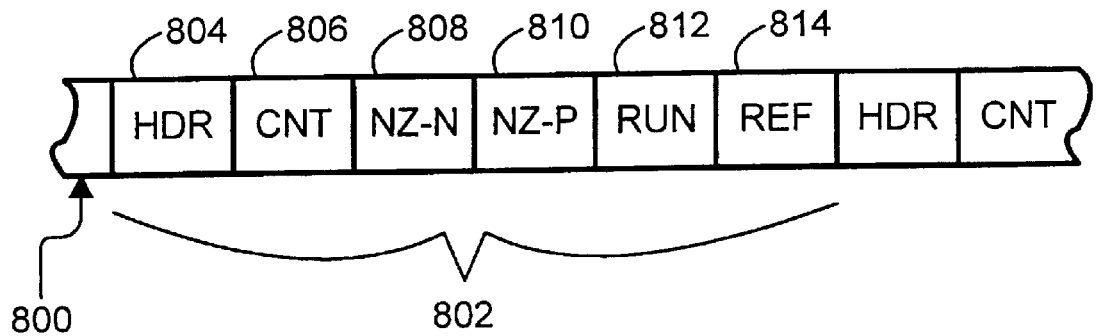
FIG. 10 is an illustration of a portion of a decoded bitstream in accordance with the present invention.

The encoder 602 could add the auxiliary information indicating boundaries of the bit-planes, boundaries of the subsequences of each bit-plane, and boundaries of the subbands of each subsequence. The information could be added off-line, after the subsequences for each bit-plane have been formed and while the subsequences are being concatenated. An example is shown in FIG. 10. The bitstream 800 includes a header 804 and count block 806 at the beginning of each bit-plane 802. The count block 806 provides auxiliary information indicating the length (i.e., number of bits) of the bit-plane and starting locations of the Non-Zero Parent, Run and Refinement subsequences 810, 812 and 814 (if the Non-Zero Neighbor subsequence 808 directly follows the count CNT, an additional count for the Non-Zero Neighbor subsequence would not be needed).

Use of the auxiliary information allows the decoder 604 to reconstruct multiple bit-planes in a single pass. Referring to FIG. 3 once again, the decoder 604 constructs subbands SB1, SB4 and SB7 of the indexed second bit-plane as follows. The decoder 604 determines that the second bit $b_1$ of coefficient A2 is a refinement bit, uses the count block 806 to index to the Refinement subsequence, unpacks a bit from the Refinement subsequence, and fills the second bit $b_1$ of the coefficient A2 with the unpacked bit. The decoder 604 then indexes once again to the Refinement subsequence, unpacks another bit and fills the second bit $b_1$ of coefficient A3. The decoder 604 then indexes to the Non-Zero Neighbor subsequence and fills the second bits $b_1$ of coefficients B3, A4 and B4. Next the decoder 604 indexes to the Non-Zero Parent subsequence and fills the second bit $b_1$ of coefficient A5. Then the decoder 604 indexes back to the Non-Zero Neighbor subsequence and fills the second bits $b_1$ of coefficients B5, C5 and D5. Next the decoder 604 indexes back to the Non-Zero Parent subsequence and fills the second bit $b_1$ of coefficient A6. Then the decoder 604 indexes to the Non-Zero Neighbor subsequence and fills the second bit $b_1$ of coefficient B6, indexes to the Refinement subsequence and fills the second bit $b_1$ of coefficient C6, and indexes to the Non-Zero Neighbor subsequence and fills the second bit $b_1$ and sign of coefficient D6. Next the decoder 604 indexes to the Run subsequence and fills the second bit $b_1$ of coefficient A7 and then indexes to the Non-Zero Neighbor subsequence and fills the second bits $b_1$ of coefficients B7, C7 and D7. Finally, the decoder 604 indexes back to the Run subsequence and fills the second bit $b_1$ and sign of coefficient A8 and the second bits $b_1$ of coefficients B8, C8 and D8.

The decoder 604 may instead use the auxiliary information to reconstruct some or all of the bit-planes in a single pass. This could be performed by fully reconstructing each subband in the direction of coarsest subband to finest subband. For example, the decoder could fill the first bit-plane of the coarsest subband SB0 with the Run subsequence, index to the Run subsequence of the second bit-plane, fill the second bit-plane of the coarsest subband SB0, index ahead to the Run subsequence of the third bit-plane, and fill the third bit-plane of the coarsest subband SB0. After the coarsest bit-plane SB0 has been reconstructed, the decoder 604 could then fully reconstruct the next subband SB1.

This, however, could create certain problems. Depending upon the context modeling for ordering and coding, the decoder 604 might need information from a higher bit-plane of neighboring coefficients in order to determine the context and decode information from a lower bit-plane of current coefficients. Therefore, the decoder 604 would have to decode ahead to the higher bit-plane of relevant neighboring coefficients. This might involve stopping the decoding of the lower bit-plane, decoding the higher bit-plane until the needed context becomes known, and then returning to the decoding of the lower bit-plane. The decoding of the needed context, in turn, might require further lookahead decoding of the context's context in yet higher bit-planes, and so on. The extent of the lookahead decoding is thus determined by the number of bit-planes. In certain applications, a sufficiently large number of bit-planes would make lookahead decoding computationally infeasible.

If a proper context model is chosen, however, such lookahead can be avoided. One such context model is the block-based context model.

Figure 11:
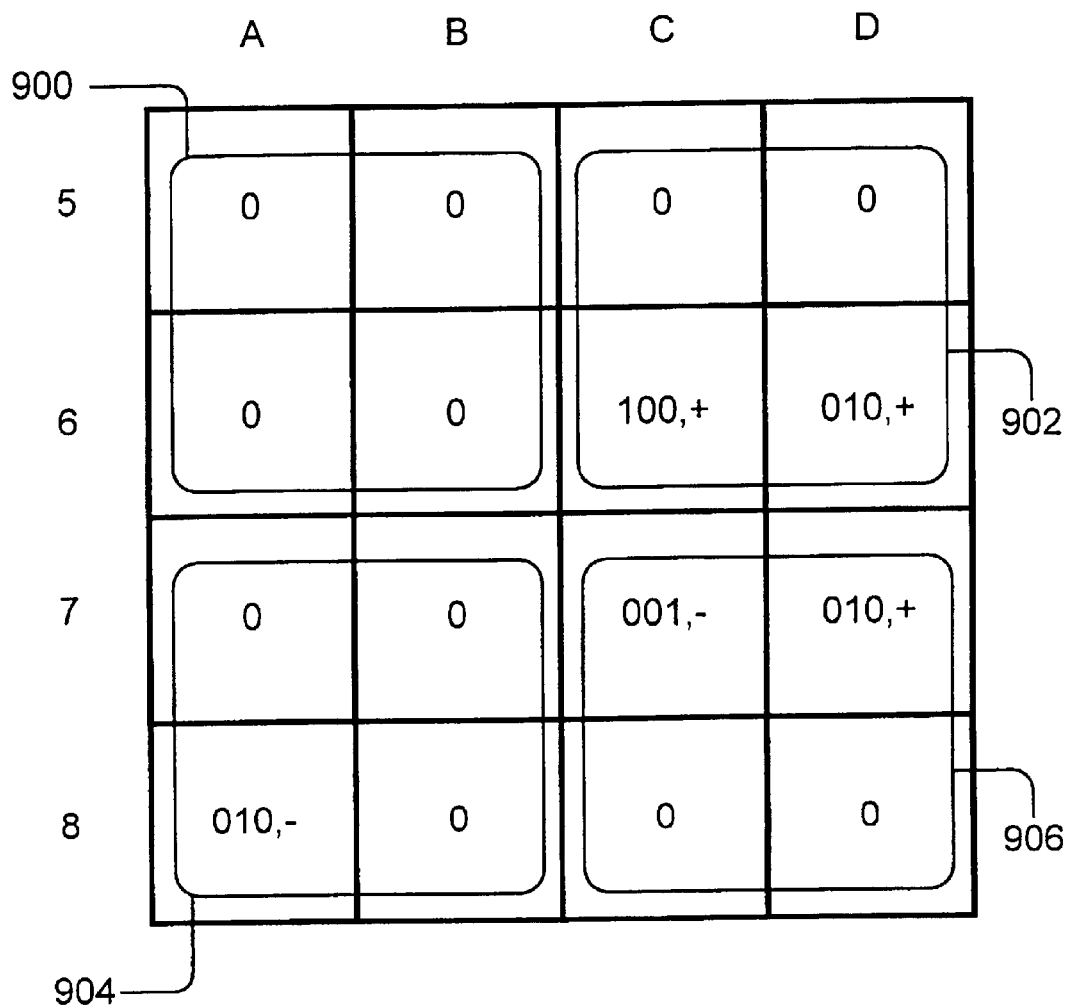
FIG. 11 is an illustration of transform coefficients in a subband, the transform coefficients being grouped according to a block-based context model.

Referring now to FIG. 11, an example of decoding subband SB7 according to a block-based context will now be provided. Neighborhoods are defined by 2×2 blocks of coefficients. Accordingly, a first neighborhood 900 is defined by coefficients A5, B5, A6, and B6; a second neighborhood 902 is defined by coefficients C5, D5, C6, and D6; a third neighborhood 904 is defined by coefficients A7, B7, A8, and B8; and a fourth neighborhood 906 is defined by coefficients C7, D7, C8, and D8.

The first neighborhood 900 is decoded first. The first bits $b_2$ of coefficients A5, B5, A6 and B6 are filled from the Run subsequence of the first bit-plane. The second bits $b_1$ of coefficients A5, B5, A6 and B6 are filled from the Non-Zero Parent subsequence of the second bit-plane (because the first bits $b_2$ within the first neighborhood 900 are all zero and because the parent coefficient A3 was found significant with respect to the first bit-plane). The third bits $b_0$ of coefficients A5, B5, A6 and B6 are filled from the Non-Zero Parent subsequence of the third bit-plane. The second neighborhood 902 is thereafter filled, followed by the third neighborhood 904 and then the fourth neighborhood 906.

Had a neighborhood been defined by eight neighboring coefficients instead of a block of neighboring coefficients, then the decoder 604 would not have been able to determine the context of the second bit $b_1$ of coefficient B5 without looking ahead to the first bit-planes of coefficients C5 and C6. Thus, a context model that does not shift for each coefficient, such as the block-based context model, avoids the need for lookahead.

The invention is not limited to the specific embodiments described and illustrated above. The decoding is not limited to the Non-Zero Neighbor, Non-Zero Parent, Run and Refinement subsequences. The subsequences and context of the decoding are dependent upon the subsequences and context of encoding. The decoding could be performed according to different orders of decreasing expected distortion reduction per expected bit of description. For example, different subsequences can be decoded in order of decreasing probability of bits being equal to one. Subsequences can be decoded in order of estimated relative magnitudes of the probabilities that bits in each of the subsequences are equal to one. The probabilities may be based on a priori assumptions about the relative magnitudes of the probabilities, the relative magnitudes of the probabilities may be determined adaptively, etc.

A bit having non-zero neighbors might be assumed to have a greater distortion reduction per expected bit of description than a bit having all insignificant neighbors, a bit having a non-zero parent is assumed to have a greater expected distortion reduction per expected bit of description than a bit having an insignificant parent, and so on.

The subsequences could be decoded based upon a context of coefficient bits in previously decoded bit-planes, the subsequences could be decoded based upon the context of coefficient bits in a current bit-plane, etc.

Reconstructing the transform coefficients is not limited to using the midpoints of the quantization intervals. The midpoints are optimal if the coefficients lying in each interval are uniformly distributed. However, this is not likely to be the case. Wavelet transform coefficients are more likely to lie closer to zero within each interval.

The reconstructed image quality may be improved by reconstructing the transform coefficients adaptively. The minimum squared error reconstruction value for a quantization interval is the average value of coefficients lying in the interval (i.e., the sample mean). Thus, the reconstructed value of an interval would be the sample mean of that interval. Either the decoder 604 would be informed of each sample mean, or the decoder 604 would estimate this quantity from previously decoded information.

A separate sample mean could be estimated for each interval. In the alternative, sample means for each quantization interval can be derived from a parsimonious (few parameters) probability model for the distribution of Wavelet coefficients. One model is based on the observation that conditional empirical distributions of wavelet transform coefficients are well approximated by Laplacian densities (of the form $\lambda e^{-\lambda|x|}$). It is assumed that wavelet transform coefficients are distributed according to a mixture of Laplacians, where one component of the mixture dominates in each of the sets $\pm[0,\Delta_0)$, $\pm[\Delta_0,\Delta_1)$, $\pm[\Delta_1, \Delta_2)$. . . $\pm[\Delta_m, \Delta_{m+1})$, where $\Delta_n = 2^n \Delta$. Let $I_n$ denote the set $\pm[\Delta_n, \Delta_{n+1})$. The encoder 602 determines the Laplacian density that best approximates the distribution of wavelet coefficients falling in each set $I_n$.

This is accomplished by determining $\lambda$ such that the conditional mean of $|x|$ relative to $I_n$ is the sample mean $\mu_n$ or average value of the absolute values of the coefficients belonging to $I_n$. Since the set $I_n$ contains coefficients that become significant in the $n^{th}$ bit-plane, the sample mean $\mu_n$ in need not be specified until the $n^{th}$ bit-plane is encoded. Prior to this all of these coefficients are quantized to, and reconstructed at, zero. Thus, each sample mean $\mu_n$ is added to the bitstream as side-information just prior to the encoding of the corresponding bit-plane.

Fix a set $I_n$ and let $I_n^+$ be the positive half of the interval $I_n$. Bit-planes n through j ($j \leq n$, as bit-planes are described in decreasing order) refine the set $I_n$ into $2^{n-j}$ sub-intervals indexed by k, and reconstruction values $r_{k,j,n}$ are determined for each sub-interval. For j=n, there is only a single sub-interval, namely $I_n^+$, and the decoder sets $r_{0,n,n} = \mu_n$. This is the minimum squared error optimal value, assuming that the coefficients are symmetrically distributed about zero. For j<n, the decoder determines the reconstruction values $r_{k,j,n}$ as the conditional expected values, relative to the corresponding sub-intervals, of the conditional Laplacian density having the sample mean $\mu_n$ as its conditional expected value relative to $I_n$. The conditional densities relative to two intervals having the same length and lying on the same side of the origin are simply shifted versions of the same density. This implies that the difference between reconstruction values $r_{k,j,n}$ and the left edge of a sub-interval in $I_n^+$ is a constant $\delta_{j,n}$. Therefore, the constants $\delta_{j,n}$ can be computed and added to the already-computed sub-interval edges to obtain the $r_{k,j,n}$. It is further assumed that the negative half $I_n^-$ of $I_n$ is treated symmetrically.

A real parameter x relates the sample mean $\mu_n$ and the constant $\delta_{j,n}$ as follows:

$$\frac{\mu_n - \Delta_n}{\Delta_n} = \frac{1}{\ln(x)} - \frac{1}{x-1}$$

and $$\frac{\delta_{j,n}}{\Delta_j} = \frac{1}{2^{j-n}\ln(x)} - \frac{1}{x^{2^{j-n}} - 1}$$

These equations can be solved numerically for $\delta_{j,n}$ in terms of $\mu_n$. However, computation speed could be accelerated by accessing the quantities $(\mu_n/\delta_{j,n})$ from a lookup table and indexed by min $((\mu_n-\Delta_n)/\Delta_n, \frac{1}{2})$ and (n−j). Some quantization may be done to reduce the size of the lookup table.

Thus, by relying on the observation that conditional empirical distributions of wavelet transform coefficients are well approximated by Laplacian distributions, the number of quantities that must be estimated are reduced. Hence the amount of side-information and the computation time are also reduced. Modifications to this parameterized reconstruction scheme include increasing the number of subintervals for which explicit sample means are encoded, and sample means could be encoded according to coefficient groups based on blocks, band, contexts, etc.

Thus disclosed is an invention that improves upon the ordering of bits in an embedded bitstream. The ordering is relatively simple and fast to perform. The ordering is not based upon complex data structures such as Zerotrees.

Moreover, the invention offers a principled basis for performing the ordering.

The invention generates subsequences that can be reasonably modeled as i.i.d., which allows the use of lower complexity coding schemes. Thus, the invention lends itself to the use of low complexity coding such as adaptive elementary Golomb encoding. Although arithmetic encoding of the subsequences could be performed, the adaptive elementary Golomb coding is much simpler to perform.

The invention provides a cleaner separation between modeling, ordering, coding and algorithmic components. This allows the invention to be tuned for particular applications (software versus hardware) and performance versus complexity tradeoffs.

The invention also allows for the decoding of an embedded bitstream in a relatively simple and fast manner. The use of auxiliary information in the bitstream allows subsequences to be decoded with a great amount of flexibility. Decoding of different bit-planes could be interleaved, decoding of different subsequences could be interleaved, and decoding of different subbands could be interleaved. The use of a block-based context model allows such decoding without the need for lookahead Single pass decoding allows decoding at the granularity of a single coefficient or a small set of coefficients. For example, all bit-planes of a single coefficient or a small set of coefficients could be decoded before decoding any bit-planes of other coefficients. This allows for memory-efficient decoding.

As already discussed, the invention is not limited to the specific embodiments described and illustrated above. Instead, the invention is construed according to the claims that follow.

What is claimed is:

1. A method of reconstructing data from a bitstream, the method comprising:
   reading encoded subsequences in the bitstream as ordered, the subsequences being read in order of decreasing expected distortion reduction per expected bit of description;
   decoding at least some of the ordered subsequences; and
   combining bits of the subsequences to obtain the reconstructed data.

2. The method of claim 1, wherein combining the subsequence bits includes filling transform coefficient bit-planes with the subsequence bits, and wherein a subsequence is decoded based upon a context of bits in at least one previously decoded bit-plane.

3. The method of claim 2, wherein a subsequence is also decoded based upon the context of bits in a current bit-plane.

4. The method of claim 2, wherein the subsequences in a bit-plane are decoded in order of decreasing probability of the subsequence bits being equal to one.

5. The method of claim 4, wherein the subsequences in a bit-plane are decoded in order of estimated relative magnitudes of the probabilities of the subsequence bits being equal to one.

6. The method of claim 5, wherein the subsequence bits in a bit-plane are decoded in order of a priori assumptions about the relative magnitudes of the probabilities.

7. The method of claim 1, wherein combining the subsequence bits includes filling transform coefficient bit-planes with the subsequence bits, and wherein a bit-plane bit having non-zero neighbors is assumed to have a greater expected distortion reduction per expected bit of description than a bit bit-plane bit having all insignificant neighbors.

8. The method of claim 1, wherein combining the subsequence bits includes filling transform coefficient bit-planes with the subsequence bits, and wherein a bit-plane bit having a non-zero parent is assumed to have a greater expected distortion reduction per expected bit of description than a bit-plane bit having an insignificant parent.

9. The method of claim 1, wherein the subsequences include a Run subsequence, a Non-Zero Parent subsequence, a Non-Zero Neighbor subsequence, and a Refinement subsequence.

10. The method of claim 1, further comprising indexing through the subsequences that have been read, the indexing being performed prior to the decoding, and wherein combining the subsequence bits includes filling a plurality of transform coefficient bit-planes with the subsequence bits in a single pass.

11. The method of claim 10, wherein multiple bit-planes of at least one coefficient are decoded before portions of other coefficients are decoded.

12. The method of claim 10, wherein multiple bit-planes of a group of coefficients are decoded before portions of other coefficients are decoded.

13. The method of claim 10, the subsequences being decoded according to a context model wherein the context for decoding a given bit is confined to a set of coefficients having a size that is independent of the number of bit-planes, whereby lookahead is avoided.

14. The method of claim 1, wherein combining the subsequence bits includes filling transform coefficient bit-planes with the subsequence bits, and wherein the method further comprises:
   reconstructing transform coefficients from the bit-planes; and
   performing an inverse transform on the reconstructed transform coefficients, an output of the inverse transform providing the reconstructed data;
   the transform coefficients being reconstructed according to a parametric model for distribution of transform coefficients becoming significant in each bit-plane.

15. The method of claim 14, wherein the distribution of the transform coefficients is approximated by a Laplacian density, and wherein the transform coefficients lying in a given quantization interval are reconstructed from a conditioned Laplacian density that best approximates the distribution of wavelet coefficients that become significant in the same bit-plane as the coefficients in that given quantization interval.

16. The method of claim 15, wherein for a given quantization interval, the transform coefficients are reconstructed by:
   determining the bit-plane in which coefficients falling in the given quantization interval become significant;
   decoding a sample mean corresponding to each of said bit-planes, each sample mean having been already encoded as side information in the bitstream;

for each of said bit-planes, determining a Laplacian density such that an expected absolute value of the density, conditioned on becoming significant in said corresponding bit-plane, is equal to the corresponding sample mean; and reconstructing the coefficients falling in the given quantization interval at the conditional expected value, relative to the given quantization interval, of the corresponding Laplacian density.

17. The method of claim 16, wherein a reconstruction point for each quantization interval is determined by using a look-up table, the look-up table being indexed by the determined bit-plane and by a quantized normalized form of the sample mean.

18. A decoder for reconstructing data from an embedded bitstream, the decoder comprising:

a processor; and processor memory encoded with a plurality of executable instructions that, when executed, instruct the processor to read encoded subsequences in the bitstream as ordered, decode bits of at least some of the ordered subsequences, and combine the decoded bits to obtain the reconstructed data, the subsequences being read in order of decreasing expected distortion reduction per expected bit of description.

19. The decoder of claim 18, wherein the instructions instruct the processor to perform a pass for each subsequence in a bit-plane and reconstruct one bit-plane at a time.

20. The decoder of claim 18, wherein the embedded bitstream includes markers indicating boundaries of the encoded subsequences, and wherein the instructions instruct the processor to process the markers to index through the subsequences in different bit-planes and combine the subsequence bits in a single pass.

21. The decoder of claim 20, wherein the instructions instruct the processor to decode multiple bit-planes of at least one coefficient before portions of other coefficients are decoded.

22. The decoder of claim 20, wherein the instructions instruct the processor to decode multiple bit-planes of a group of coefficients before portions of other coefficients are decoded.

23. The decoder of claim 18, the subsequences being decoded according to a context model wherein the context for decoding a given bit is confined to a set of coefficients having a size that is independent of the number of bit-planes, whereby lookahead is avoided.

24. The decoder of claim 23, wherein the context model is a block-based context model.

25. The decoder of claim 18, wherein the instructions instruct the processor to order the subsequence bits into bit-planes of transform coefficients, and wherein the instructions instruct the processor to decode bits of a subsequence based upon a context of coefficient bits in at least one previously decoded bit-plane.

26. The decoder of claim 25, wherein the instructions further instruct the processor to decode the subsequence bits based upon the context of coefficient bits in a current bit-plane.

27. The decoder of claim 25, wherein the subsequence bits are decoded in order of decreasing probability of being equal to one.

28. The decoder of claim 27, wherein the subsequence bits are decoded in order of estimated relative magnitudes of the probabilities of being equal to one.

29. The decoder of claim 25, wherein a decoded subsequence bit having non-zero neighbors with respect to a higher bit-plane is assumed to have a greater expected distortion reduction per expected bit of description than a decoded subsequence bit having all insignificant neighbors with respect to a higher bit-plane.

30. The decoder of claim 25, wherein a decoded subsequence bit having a non-zero parent with respect to a higher bit-plane is assumed to have a greater expected distortion reduction per expected bit of description than a decoded subsequence bit having an insignificant parent with respect to a higher bit-plane.

31. The decoder of claim 18, wherein the subsequences include a Run subsequence, a Non-Zero Parent subsequence, a Non-Zero Neighbor subsequence, and a Refinement subsequence.

32. The decoder of claim 18, wherein the instructions further instruct the processor to reconstruct transform coefficients from the reconstructed bit-planes, and perform an inverse transform on the reconstructed transform coefficients, an output of the inverse transform providing the reconstructed data, the transform coefficients being reconstructed according to a parametric model for each bit-plane.

33. The decoder of claim 32, wherein distribution of the transform coefficients is approximated by a Laplacian density, and wherein the transform coefficients lying in a given quantization interval are reconstructed from a conditioned Laplacian density that best approximates the distribution of wavelet coefficients that become significant in the same bit-plane as the coefficients in that given quantization interval.

34. Apparatus for reconstructing data from an embedded bitstream, the apparatus comprising:

means for reading encoded subsequences in the bitstream as ordered, the subsequences being read in order of decreasing expected distortion reduction per expected bit of description;

means for decoding at least some of the ordered subsequences; and means for combining bits of the subsequences to obtain the reconstructed data.

35. An article of manufacture for a processor, the article comprising:

processor memory; and a plurality of executable instructions encoded in the processor memory, the instructions, when executed, instructing the processor to read encoded subsequences in an embedded bitstream as ordered, decode at least some of the ordered subsequences, and combine bits of the subsequences to obtain reconstructed data, the subsequences being read in order of decreasing expected distortion reduction per expected bit of description.

36. The article of claim 35, wherein the instructions instruct the processor to combine the decoded subsequence bits by filling a plurality of bit-planes of transform coefficients with the decoded subsequence bits, and wherein the instructions instruct the processor to decode bits of a subsequence based upon a context of coefficient bits in at least one previously decoded bit-plane.

37. The article of claim 35, wherein the instructions further instruct the processor to reconstruct transform coefficients from the reconstructed bit-planes, and perform an inverse transform on the reconstructed transform coefficients, an output of the inverse transform providing the reconstructed data, the transform coefficients being reconstructed according to a parametric model for distribution of transform coefficients becoming significant in each bit-plane.

38. The article of claim 37, wherein the distribution of the transform coefficients is approximated by a Laplacian density, and wherein the transform coefficients lying in a given quantization interval are reconstructed from a conditioned Laplacian density that best approximates the distribution of wavelet coefficients that become significant in the same bit-plane as the coefficients in that given quantization interval.

39. The article of claim 35, wherein the instructions instruct the processor to perform a pass for each subsequence of a bit-plane, and reconstruct one bit-plane at a time.

40. The article of claim 35, wherein the embedded bitstream includes markers indicating boundaries of the encoded subsequences, and wherein the instructions instruct the processor to use the markers to index through the subsequences of different bit-planes and fill a plurality of bit-planes with decoded subsequence bits in a single pass.

41. The article of claim 40, wherein the instructions instruct the processor to decode multiple bit-planes of at least one coefficient before portions of other coefficients are decoded.

42. The article of claim 40, wherein the instructions instruct the processor to decode multiple bit-planes of a group of coefficients before portions of other coefficients are decoded.

43. The article of claim 40, the subsequences being decoded according to a context model wherein the context for decoding a given bit is confined to a set of coefficients having a size that is independent of the number of bit-planes, whereby lookahead is avoided.

44. An encoder comprising.

a processor; and processor memory encoded with a plurality of executable instructions that, when executed, instruct the processor to separate the input data into a plurality of subsequences, order the subsequences according to decreasing expected distortion reduction per expected bit of description, encode at least some of the ordered subsequences, and add auxiliary information indicating boundaries of the subsequences.

* * * * *